Patented Sept. 8, 1936

2,053,740

UNITED STATES PATENT OFFICE 2,053,740

PROCESS OF PRESERVING

Joseph S. Reichert, Robert W. McAllister, and Wilbie S. Hinegardner, Niagara Falls, N. Y., assignors to E. I. du Pont de Nemours & Company, Inc., Wilmington, Del., a corporation of Delaware No Drawing. Application September 28, 1934, Serial No. 745,940

4 Claims. (Cl. 99—213)

This application relates to a process of treating cream and mixtures containing cream in order to improve their keeping qualities. More specifically, it involves the use of hydrogen peroxide or of a material forming hydrogen peroxide in the material for the purpose of preserving cream or cream mixtures which may be stored for days or weeks before use. This application is, in part, a continuation of the earlier applications filed in the names of Joseph S. Reichert and Robert W. McAllister in the Patent Office on April 24, 1934 and May 4, 1934. These applications bear, respectively, the Serial Numbers 722,148 and 723,942.

In the commercial handling of cream, it is usual to store it for days or even weeks before it is used. While the cream that is ordinarily sold to consumers directly by dairymen has not usually been allowed to stand this long, it is customary in the making of butter to store the cream employed for some time prior to its use.

The preservation of cream so as to impart to it improved keeping properties so that it may not become rancid or sour during the storage period has been the subject of considerable investigation, both by scientific authorities and by commercial companies. However, the efforts of the dairy industry to devise a method which would decrease the bacterial content of cream to such a degree that spoilage will not occur during storage for reasonable lengths of time have been generally unsuccessful. The methods now in use for the preservation of cream do not destroy the bacteria present therein which bring about deterioration of the product to a degree effective enough to enhance the keeping properties sufficiently to meet the needs of commercial operation.

The best method that the prior art has been able to develop to retard the spoilage of cream or of mixtures containing cream is the familiar pasteurization process. Pasteurization as a method of preservation is open to several serious objections. For example, an expensive pasteurizing equipment is necessary and this must be carefully maintained in operating condition since a change of even a few degrees in the pasteurization temperature may result in a product of unsatisfactory character.

Then the pasteurization method, whether it be the so-called "holding" method of heat treatment between 142° and 145° F. (61.1° to 62.8° C.) or the "flash" method of heat treatment at temperatures of 176° to 185° F. (80° to 85° C.) does not destroy all bacterial organisms present in the cream or cream mixture. The most that public health authorities have claimed for either method of pasteurization is that the pathogenic organisms are destroyed. While it is not essential that all bacterial organisms be destroyed, i. e., that the cream be rendered sterile, ordinarily, pasteurization has not been successful in reducing bacterial growth to a degree sufficiently low to prevent subsequent spoilage when the cream is permitted to stand either at room temperature or at a temperature corresponding to that of a refrigerator for the ordinary periods of storage. Consequently, while cream is rendered safer for human consumption as a result of the destruction of the disease carrying organisms by pasteurization, and while its keeping properties are enhanced to some extent by the process, still, as a result of the presence of undestroyed living bacterial organisms therein, pasteurized cream eventually turns sour and becomes spoiled. Ordinarily, spoilage occurs at less than the customary period of storage in those industries, such as that of butter making, where the cream is normally stored prior to use.

There are, however, other very serious objections to pasteurization as a method for the preservation of cream. There is a tendency of the fat globules in cream to coagulate and become larger in size, especially in those treatments wherein the higher temperatures and relatively longer periods of treatment are employed. Moreover, physical or chemical changes may occur in the protein of the cream, and its viscosity is decreased substantially by heat treatments, especially those at the higher temperatures (in excess of 62° C.) and for periods in excess of thirty minutes. Obviously, with lowered viscosity, there is a financial loss to dairymen because, universally, "heavy whipping cream" commands a higher price than the thinner and less viscous grades.

By the use of hydrogen peroxide as a medium for sterilizing cream or rendering cream partially sterile, we have obviated many of the disadvantages which reside in the pasteurization method of preserving cream or cream mixtures. We have found that cream can be rendered almost completely sterile merely by treatment with hydrogen peroxide in amounts equivalent to 0.03% of hydrogen peroxide, based on the weight of the cream. Usually, 0.03% by weight of hydrogen peroxide is enough, but under some circumstances, amounts up to 0.07% may be necessary in order to obtain a cream of sufficiently lowered bacterial count. Cream treated in this way, by the addition of hydrogen peroxide thereto in amounts ranging from 0.03% to 0.07% by weight, has been found to remain sweet during a four month storage period at temperatures corresponding to ice box temperatures and for a storage period of one month when permitted to stand at room temperature. Obviously, the amounts of hydrogen peroxide added are extremely small and during the storage period, the presence of free peroxides in the cream can be determined only by the most delicate of qualitative tests. It is known generally that cream and milk products may contain organic peroxides which respond to the more delicate of the tests for peroxides, such as the test with $p$. phenylene diamine hydrochloride, and the obtainment of a positive indication for peroxide in cream treated with hydrogen peroxide does not mean that free hydrogen peroxide is present therein as such.

As an alternative method, we have found that the quantity of hydrogen peroxide which should be added may be reduced by combining a step of heat treating with the step of adding hydrogen peroxide. By the conjoint action of hydrogen peroxide and heat on the cream treated, we have found that the degree of destruction of bacteria present may be greatly increased. Thus, we have found that 40% cream may be rendered almost completely sterile, i. e., free from bacterial growth of any sort, by the addition thereto of 0.02% of hydrogen peroxide by weight, followed by heating at 62° C. for a period of from 15 to 30 minutes. A temperature below 62° C. may be used but the temperature, in general, preferably should not vary substantially on either side of the limits recognized as suitable for pasteurization by the "holding" method, which temperatures are 61° to 63° C. However, the temperature may be lowered to about 55° C., especially in those cases where the larger amounts of hydrogen peroxide are used.

When our process involving the addition of a relatively smaller amount of hydrogen peroxide, i. e., of the order of 0.02% to 0.04% by weight, together with a heat treatment at a temperature of 55° to 63° C. is employed, the undesirable effects associated with normal pasteurization methods are almost entirely avoided. This is because the time during which the cream must be heated to the elevated temperature is less than that normally necessary in many pasteurization methods. Thus, when the amounts of hydrogen peroxide specified are added, we have found that the cream may be heated at 61° to 63° C. for a period as little as 10 minutes and still a product having a degree of sterility much higher than that obtainable by usual pasteurization methods results.

The product produced by the conjoint action of hydrogen peroxide and heat is markedly superior to the pasteurized product, both in the quality of the cream as regards its viscosity and in the number of bacterial organisms remaining undestroyed therein. Completely sterile cream cannot be prepared by pasteurization alone, whereas by the conjoint action of hydrogen peroxide and heat, as described, a product will result which is completely sterile. This will be evident from the following examples where the number of living bacteria present in different cream samples subjected to different processes of treatment to enhance their keeping properties have been determined in accordance with the usual method of bacteriology. This method involves allowing the bacteria in a sample of cream to develop on a nutrient agar plate and then counting the colonies developed. Each colony developed is assumed to have resulted from a single bacterium. Plating a sample of given volume therefore will result in a determination of the number of bacteria per cubic centimeter.

Example 1

Samples of 20% and 40% cream were treated with hydrogen peroxide in amounts ranging from 0.01% to 0.03% by weight. In addition, a control sample was prepared to which no hydrogen peroxide had been added. After the addition of hydrogen peroxide, the temperature was maintained at 62° C. for a period of about 30 minutes. Thereafter, some of the 40% cream samples were stored at room temperature and some of both consistencies at a temperature corresponding to that maintained by an ice box or electric refrigerator, i. e., 2° to 4° C. for periods up to 53 days.

Bacterial counts were run on the different samples by transferring a small portion of the product to a nutrient agar plate and allowing the bacterial colonies to develop for 48 hours thereon. The number of bacteria per cc. in the original small portion at the time taken, which is, of course, representative of the concentration in the entire sample, as determined by this method, are given in the following table:

| Sample number | Cream | Temperature when $H_2O_2$ was added | Preservation temperature | Time between $H_2O_2$ addition and plating | Bacteria count for the different $H_2O_2$ treated samples | | | |
|---|---|---|---|---|---|---|---|---|
| | | | | | None | 0.01% | 0.02% | 0.03% |
| | Percent | °C. | | Days | | | | |
| 1 | 40 | 62 | Room Temp. | 2 | 18,000 | None | None | None |
| 2 | 40 | 62 | Room Temp. | 53 | Spoiled | Spoiled | 7,800 | 650 |
| 3 | 20 | 62 | 2–4° C. | 2 | 192,000 | 204,000 | 120,000 | 432,000 |
| 4 | 40 | 62 | 2–4° C. | 2 | None | None | None | 8,000 |
| 5 | 20 | 62 | 2–4° C. | 53 | None | None | None | 2,500 |
| 6 | 40 | 62 | 2–4° C. | 53 | None | None | None | 4,000 |

In those samples which were marked "spoiled", the bacterial growth was very high, probably several million per cc. These products were plainly rancid in appearance, taste and odor.

Example 2

Samples of 20% and 40% cream were treated at room temperature with the amounts of hydrogen peroxide ranging from 0.03% to 0.09% by weight, based on the weight of the cream. Previous to treatment, the cream had been allowed to stand so that its temperature had attained room temperature. After the addition of hydrogen peroxide, the cream samples were preserved in an electric refrigerator. At the end of 158 days, the cream samples were removed and observed for possible rancidity or sourness. As enumerated below, all those samples to which more than 0.01% of hydrogen peroxide had been added, were of sweet normal odor and taste and had not spoiled.

| Sample number | Preservation temperature | Time since treating with $H_2O_2$ | $H_2O_2$ | Condition at end of period |
|---|---|---|---|---|
| | °C. | Days | Percent | |
| 1 | 2-4 | 158 | 0.09 | Sweet normal odor and taste. |
| 2 | 2-4 | 158 | 0.06 | Do. |
| 3 | 2-4 | 158 | 0.03 | Do. |
| 4 | 2-4 | 158 | 0.01 | Rancid and sour. |
| 5 | 2-4 | 158 | None | Very rancid with extremely unpleasant odor and taste. |

It is thus observable from the results tabulated above that hydrogen peroxide either alone or when employed in conjunction with heat treatment is a very effective agent for improving the keeping properties of cream and cream mixtures. It is evident that no possible method of pasteurization now known to the dairy industry can preserve cream so that it will remain sweet and unsoured during a storage period of 158 days. This period far exceeds the normal period of storage even in circumstances in those industries, such as butter making, where the cream may be preserved for relatively long periods of time prior to use. Obviously, our process is a distinct contribution to that industry and to any other industry where storage is necessary, for we have extended by a considerable extent the period during which cream or cream mixtures may be stored before they become rancid or sour.

It is to be understood that the various procedures and amounts defined in the examples above given are merely illustrative and in no sense are to be considered as restrictive of our invention.

It is also to be understood that wherever thruout the appended claims "cream" is referred to, this term is to be interpreted to include mixtures containing cream, or mixtures wherein cream is a dominant component. Similarly, the term "hydrogen peroxide" is to be interpreted to cover an agent or agents which, under the conditions of operation, form or yield hydrogen peroxide.

Having thus described our invention, what we desire to secure for Letters Patent is:

1. A process of preserving cream which comprises adding hydrogen peroxide thereto in amounts ranging from 0.01 to 0.09 per cent by weight, based on the weight of the cream, and heating at a temperature of 61–63° C. for 15 to 30 minutes.

2. A process of preserving cream which comprises adding hydrogen peroxide thereto in amounts ranging from 0.02 to 0.04 per cent by weight, based on the weight of the cream, and heating at a temperature of 61–63° C. for a period of 15 to 30 minutes.

3. A process of preserving cream which comprises adding hydrogen peroxide thereto in amounts ranging from 0.02 to 0.04 per cent by weight, based on the weight of the cream, and heating at a temperature of 61–63° C. for a period of 30 minutes.

4. A process of preparing completely sterile cream which comprises adding hydrogen peroxide to cream and heating at a temperature of 61–63° C. for a period of time ranging from 15 to 30 minutes.

JOSEPH S. REICHERT.
ROBERT W. McALLISTER.
WILBIE S. HINEGARDNER.